US007176917B1

(12) United States Patent
Morgan et al.

(10) Patent No.: US 7,176,917 B1
(45) Date of Patent: Feb. 13, 2007

(54) VISUAL PROGRAMMING INTERFACE FOR A THREE-DIMENSIONAL ANIMATION SYSTEM FOR DEFINING REAL TIME SHADERS USING A REAL-TIME RENDERING ENGINE APPLICATION PROGRAMMING INTERFACE

(75) Inventors: Gareth Morgan, St-Joseph-de-Ham-Sud (CA); Daniel Beaudry, Montreal (CA); Ian Stewart, Montreal (CA); Luc Bolduc, Montreal (CA); Alexandre Jean Claude, Montreal (CA)

(73) Assignee: Avid Technology, Inc., Tewksbury, MA (US)

( * ) Notice: Subject to any disclaimer, the term of this patent is extended or adjusted under 35 U.S.C. 154(b) by 416 days.

(21) Appl. No.: 10/216,563

(22) Filed: Aug. 9, 2002

(51) Int. Cl.
*G06T 15/00* (2006.01)
(52) U.S. Cl. .................................................. 345/426
(58) Field of Classification Search ................ 345/426, 345/619
See application file for complete search history.

(56) References Cited

U.S. PATENT DOCUMENTS 6,496,190 B1 * 12/2002 Driemeyer et al. ......... 345/619
6,717,576 B1     4/2004 Duluk, Jr. et al.

OTHER PUBLICATIONS

Tucker, Allen B., Jr., The Computer Science and Engineering Hanbook, "RenderMan: An Interface for Image Synthesis", pp. 1375-1395, © 1997.

Abram, Gregory D., et al., "Building Block Shaders", Computer Graphics, vol. 24, No. 4, Aug. 1990, pp. 283-288.

Cook, Robert L., et al., "The Reyes Image Rendering Architecture", Computer Graphics, vol. 21, No. 4, Jul. 1987, pp. 95-102.

Cook, Robert L., "Shade Trees", Computer Graphics, vol. 18, No. 3, Jul. 1984, pp. 223-231.

(Continued)

*Primary Examiner*—Almis Jankus
(74) *Attorney, Agent, or Firm*—Peter J. Gordon; John A. Hamilton

(57) ABSTRACT

A visual programming interface allows an artist to create real time shaders using a tree of shader nodes. Each shader node represents an operation that can be performed in real time through the real time rendering engine. The visual interface allows the arbitrary combinations of these shader nodes to be made and allows the parameters of the shaders to be manipulated or animated. The visual programming interface may be activated in an interactive animation environment through a designation that a real time shader is to be applied to a surface. By integrating the visual programming interface with an interactive animation environment, an artist can experiment readily with different custom real time shaders. An artist also has the flexibility to create arbitrary real time shader trees and to view them interactively without requiring a programmer to develop or modify a custom shader. Basic operations represented by such shader nodes include drawing to a frame buffer (which may include a blending operation with the contents of the frame buffer), a transform operation and lighting operations. A tree of shader nodes may be processed in multiple passes. Each drawing operation in the tree defines a separate pass. The result of each pass is blended with the results of prior passes according to parameters defined for the drawing operation.

4 Claims, 2 Drawing Sheets

OTHER PUBLICATIONS

Haeberli, Paul E., ConMan: A Visual Programming Language for Interactive Graphics, vol. 22, No. 4, Aug. 1988, pp. 103-111.

Lastra, Anselmo, et al., "Real-Time Programmable Shading", 1995 Symposium on Interactive 3D Graphics, Monterey CA, 1995 ACM, pp. 59-66, 207.

Olano, Marc, et al., "A Shading Language on Graphics Hardware: The PixelFlow Shading System", Proceedings of SIGGRAPH 98, Jul. 19-24, 1998, pp. 1-10.

Nadas, Tom, et al., "GRAPE: An Environment to Build Display Processes", 1987 ACM-0-89791-227-6/87/007/0075, pp. 75-84.

Peercy, Mark S., et al., "Interactive Multi-Pass Programmable Shading", SIGGRAPH 2000, ACM 2000, pp. 425-432.

Proudfoot, Kekoa, et al., "A Real-Time Procedural Shading System for Programmable Graphics Hardware", ACM SIGGRAPH 2001, Aug. 12-17, 2001, pp. 159-170.

* cited by examiner

VISUAL PROGRAMMING INTERFACE FOR A THREE-DIMENSIONAL ANIMATION SYSTEM FOR DEFINING REAL TIME SHADERS USING A REAL-TIME RENDERING ENGINE APPLICATION PROGRAMMING INTERFACE

BACKGROUND

Shaders are programs for three-dimensional graphics applications that define the color at each pixel on a surface. Shaders thus define surface and lighting effects for a shape. Shaders can be developed by combining multiple operations using a technique called a shade tree, such as described in "Shade Trees" by Robert L. Cook, in *Computer Graphics*, Vol. 18, No. 3, July 1984, pp. 223–231. The actual computation time required to render a surface to which a shader has been applied depends on a number of factors.

Having a shader operate in real-time depends on the capabilities of the computation hardware used to perform the computations. Currently, several hardware-based real-time rendering engines are available that allow a shader to be defined using operations from an application programming interface (API) for the real-time rendering engine. Typically, a computer programmer writes a computer program that defines a shader using this API to provide commands to the hardware.

It is currently time consuming to develop custom shaders for surface and lighting effects for real time environments because such development requires knowledge of low level APIs and programming skills. Once developed by a programmer, custom shaders are incorporated by an animator or artist in a three-dimensional animation system to develop content for a target platform. Additional programming is required by the programmer if the artist wants to modify a custom shader in some manner other than by modifying specific parameters defined by the programmer. This process is time consuming, costly, and limits the ability of the artist to create different effects. Also, experimentation with different shaders in this context takes a long time and is thus prohibitive.

SUMMARY

A visual programming interface allows an artist to create real time shaders using a tree of shader nodes. Each shader node represents an operation that can be performed in real time through the real time rendering engine. The visual interface allows the arbitrary combinations of these shader nodes to be made and allows the parameters of the shaders to be manipulated or animated. The visual programming interface may be activated in an interactive animation environment through a designation that a real time shader is to be applied to a surface. By integrating the visual programming interface with an interactive animation environment, an artist can experiment readily with different custom real time shaders. An artist also has the flexibility to create arbitrary real time shader trees and to view them interactively without requiring a programmer to develop or modify a custom shader.

The shader nodes represent basic operations of the application programming interface for a real time rendering engine, combinations of such operations or a reference to an image. Example basic operations represented by such shader nodes include drawing to a frame buffer (which may include a blending operation with the contents of the frame buffer), a transform operation and lighting operations. A tree of shader nodes may be processed in multiple passes. Each drawing operation in the tree defines a separate pass. The result of each pass is blended with the results of prior passes according to parameters defined for the drawing operation.

DETAILED DESCRIPTION

Figure 1:
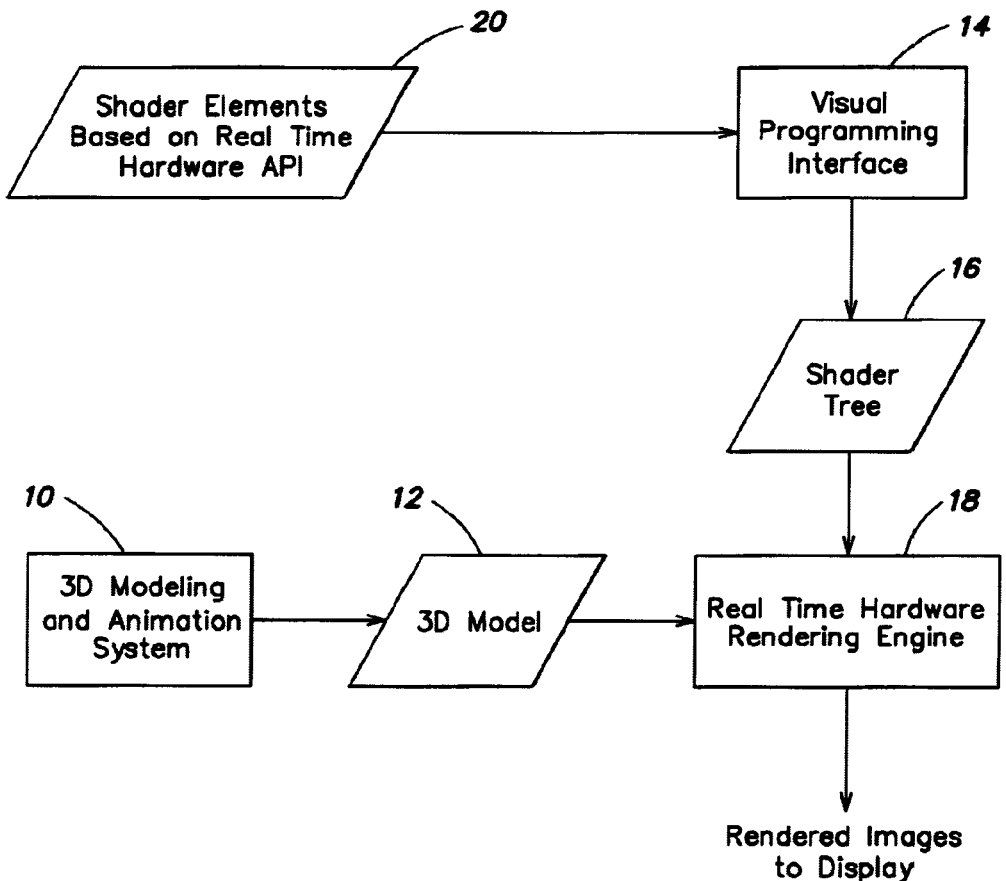
FIG. 1 is a block diagram of an example system that provides a visual programming interface for real-time shaders.

Referring to FIG. 1, a block diagram of an example system that provides a visual programming interface for creating custom real-time shaders will now be described. This system includes a three-dimensional model generation and animation system 10. An example of such a system is the Softimage|XSI animation system from Softimage, Inc., of Montreal, Canada. In such a system an artist may define one or more three-dimensional models 12, and animation of such three dimensional models. The system allows the artist to associate a shader with each surface of a model, for example through a menu associated with the surface. In particular, an animation system generally allows an animator to associate a texture or material with the surface of an object. One material type that may be selected is a "real time shader" type, which can be defined using a visual programming interface 14. The visual programming interface 14 allows the artist to define the real time shader 16 that is associated with the model and animation 12. The real time shader and the model and animation are provided to a real-time rendering engine 18. This real time engine generates rendered images of the model or animation according to the specified real time custom shader. When used in an interactive animation environment, such as described in U.S. Pat. No. 5,977,982, which is hereby incorporated by reference, an artist is provided with an increased capability to experiment with a variety of surface and lighting effects.

The visual programming interface 14 provides the artist with access to basic shader elements 20 that are defined to correspond to commands in the application programming interface of the real-time rendering engine 18. A real time shader that has been defined using the basic shader elements 20 also may be accessible through the visual programming interface and may be used as an element of a another real time shader. An image clip also may be provided as a shader element 20.

The real-time hardware engine will now be described in more detail. A real-time rendering engine typically is provided as part of a computer platform on which the three-dimensional authoring application is executed, and typically includes a graphics card that includes a graphics processor with a specified application programming interface. Commands provided through this interface are interpreted and optimized by the hardware to operate in real time. Examples of commercially available real-time hardware rendering engines include the Microsoft XBOX, Sony Playstation, and Nintendo GameCube game platforms and other hardware platforms that support Direct3D, OpenGL and other graphics APIs. Such a platform typically has a frame buffer that stores image data and performs image operations on the data in the frame buffer.

Figure 2:
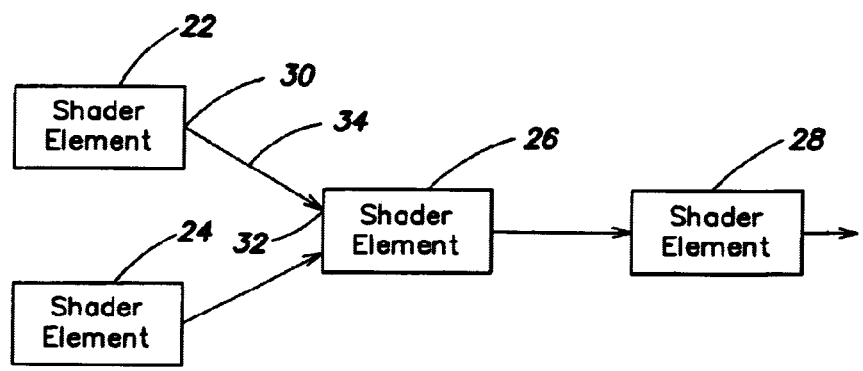
FIG. 2 is an example interface illustrating how a tree of shader elements may be combined visually.

The visual programming interface for creating real-time shaders that use the real-time hardware engine will now be described in more detail, with reference to FIG. 2. In the visual programming interface, a user selects shader elements that have an output node and may have an input node. Predefined shader elements or previously defined real time shaders may be accessed through a "library" or other similar mechanism through the user interface. Each shader element that is selected is represented graphically on a computer display, for example as a rectangle, as shown at 22, 24, 26 and 28 in FIG. 2. A connection between an output (e.g., 30) of one shader element and an input (e.g., 32) of another shader element is represented graphically by a line (e.g., 34). The connections represent data flow from the output of a process performed by a shader element to an input of another shader element. Real time shader elements thus are combined in a manner similar to an "Effect Tree" that is used in compositing applications to define a combination of image operations. The properties of each of the real time shader elements may be edited in a property editor for the real time shader tree. An effect tree and property editor is described in copending U.S. patent application Ser. No. 09/369,688, entitled "Editor for Effect Tree Parameters," filed Aug. 6, 1999, which is hereby incorporated by reference. The implementation of the effect tree and its property editor may be applied to create this visual programming interface for real time shaders.

Figure 3:
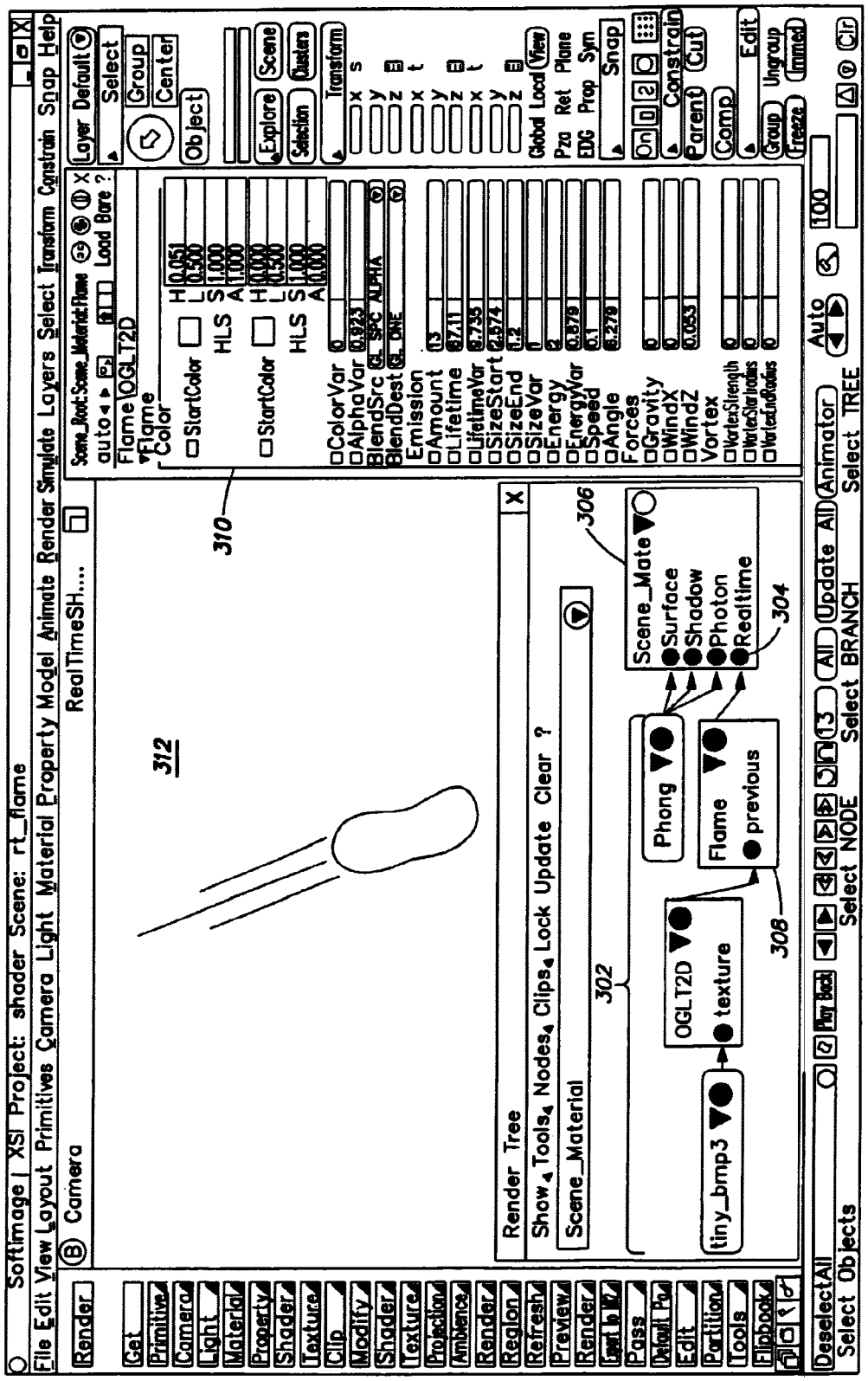
FIG. 3 is an example user interface for a three-dimensional authoring tool with a visual programming interface.

An example user interface is shown in FIG. 3. A visual programming interface is shown at 300, in which a shader tree 302 is connected to a real time input 304 of a material node 306. Properties of a shader that is selected, such as shader 308, may be edited using the property editor 310, which is similar to the property editor described above. A viewer window 312 displays the result of the rendering of the shader tree.

The basic real time shader elements from which all other real time shaders are created are defined to correspond to functions that can be performed in real time by the real time rendering engine through its application programming interface. Each of the basic real time shader elements has a number of properties that can be defined by the end user using the property editor, and has an associated function that it performs using those properties.

Each real time shader element should have access to data defining a rendering context (such as an OpenGL context), data defining the surface (typically a set of vertices, triangles, colors, uv data, normals, materials and textures, and a property page. Given this information, each shader can set render states (vertex/pixel shader, materials, textures, alpha blending, lighting, antialiasing, mip mapping and other state information), change the final geometry by modifying uv data, vertices, colors and normals, and override the drawing code.

In one embodiment, where the real time hardware engine supports the OpenGL API, example types of real time shader elements are the following:

Draw. A draw shader corresponds to the OGLDraw command and defines and executes a single OGL rendering pass by determining the OGL state, and then drawing. The draw shader is essential to most realtime shader trees because it draws the result of the chain of shaders leading into it. It is the only core realtime shader that can be connected directly to the material node's real time input. Thus, for example, the shader element 28 of FIG. 2 would be a draw shader that connects to the real time input of a material node.

Shade. A shade shader corresponds to the OGLShade command and sets lighting characteristics of an object. It defines the ambient, diffuse, specular, and emissive RGBA values of an object, as well as the size of the specular highlight of the object.

Single Texture. A single texture shader corresponds to the OGLT2D commmand and defines the image source, projection method and other attributes of a single texture image. This shader may be used to identify an image as a relection map, rather than as a directly applied texture.

Texture Transform. A texture transform shader corresponds to the OGLTCrans command and applies a variety of transformations to input textures. Transformations are animatable, either by keying or by enabling one of several modulation modes, which are are also animatable. The modulation options animate the basic transformation according to one of several available waveforms.

Combined. A combined shader corresponds to the OGLCom command and is a draw shader, a shade shader, and a single texture shader in a single package. The combined shader is useful in cases where you would otherwise use a single instance of each shader to create the desired effect. Otherwise, using the combined shader can create unnecessary calculations.

Multiple Texture. A multiple texture shader corresponds to the OGLMulti command and combines four single texture shaders in one property editor. The basic attributes of each of the single texture shaders may be set and these shaders may be blended together using modulation functions. A simpler set of blending functions may be provided for the multiple texture shader. Full control over blending of multiple single texture shaders can be provided by using separate single texture shaders.

An image clip node also is provided. The image clip merely represents an image and may be attached to an input of any of these shaders.

More complex real time shaders may be specified by creating a shader tree using these basic shader elements. Each real time shader tree ends with a draw shader having its output connected to the real time input of the material node associated with the surface of an object.

Using OpenGL, a real time shader is rendered using a multipass process that uses the OpenGL state and state change to build an effect that is drawn onto an object. The real time shader is applied during the traversal of the geometry of the object during rendering by the real time rendering engine. For example, when the OpenGL display is about to set material and texture bindings for an object, then it also checks for the existence of a real time shader applied to the realtime input of the material node associated with the surface of the object. If such a real time shader is present, the render function is executed.

In a realtime shader tree, the shader nodes are executed sequentially starting with the node farthest from the material node, and ending with the one that is closest. Each draw node in the sequence reads the OGL state and draws a single layer, or pass, based on that state. The draw node connected to the material node draws the cumulative result of the entire shader tree onto the object. Successive passes are drawn one on top of the other, and blended together using OGL alpha blending in a frame buffer to create an overall effect, like compositing. After a pass is drawn, the results become the background that will be blended with the results of the next pass, which become the foreground. The properties of the draw shader specify the blending modes, indicating how any foreground layer (the input to the draw shader) is applied to a background layer (the contents of the frame buffer).

By integrating such a visual programming interface that exposes the API of a real-time hardware rendering engine to allow an artist to create custom real-time shaders with an interactive rendering environment in a three-dimensional authoring application, the ability of an artist to experiment with different effects is significantly increased.

Having now described an example embodiment, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. Apparatus for defining surface and lighting effects to be applied to a three-dimensional surface in a computer, comprising:
    means for defining three dimensional objects having animation over time and associated lighting and surface properties;
    means for enabling an author to associate a custom shader with a defined three dimensional object to define the lighting and surface properties of the object, wherein the shader is defined as a graph of subshaders, wherein each subshader is defined to perform a real time function from an application programming interface of a real-time runtime rendering engine;
    means for enabling an author to edit the custom shader using visual programming techniques to illustrate the graph and to allow interconnection of subshaders as nodes of the graph including selection of subshaders from a library of subshaders wherein the subshaders are defined to perform real time functions from the application programming interface of the real-time runtime rendering engine; and
    means for interactive rendering of the animation using the custom shader and applying the custom shader to a real-time rendering engine that implements the application programming interface of the real-time runtime rendering engine.

2. A computer program product, comprising:
    a computer readable medium;
    computer program instructions stored on the computer readable medium that, when instructed by a computer, defines an apparatus for defining surface and lighting effects to be applied to a three-dimensional surface in a computer, comprising:
    means for defining three dimensional objects having animation over time and associated lighting and surface properties;
    means for enabling an author to associate a custom shader with a defined three dimensional object to define the lighting and surface properties of the object, wherein the shader is defined as a graph of subshaders, wherein each subshader is defined to perform a real time function from an application programming interface of a real-time runtime rendering engine;
    means for enabling an author to edit the custom shader using visual programming techniques to illustrate the graph and to allow interconnection of subshaders as nodes of the graph including selection of subshaders from a library of subshaders wherein the subshaders are defined to perform real time functions from the application programming interface of the real-time runtime rendering engine; and
    means for interactive rendering of the animation using the custom shader and applying the custom shader to a real-time rendering engine that implements the application programming interface of the real-time runtime rendering engine.

3. Apparatus for defining surface and lighting effects to be applied to a three-dimensional surface in a computer, comprising:
    means for defining three dimensional objects having animation over time and associated lighting and surface properties;
    means for enabling an author to associate a custom shader with a defined three dimensional object to define the lighting and surface properties of the object, wherein the shader is defined as a graph of subshaders, wherein each subshader is defined to perform a real time function selected from a set of functions that provides an interface for application programs to access a real-time runtime rendering engine;
    means for enabling an author to edit the custom shader using visual programming techniques to illustrate the graph and to allow interconnection of subshaders as nodes of the graph including selection of subshaders from a library of subshaders wherein the subshaders are defined to perform real time functions selected from the set of functions that provides the interface for application programs to access the real-time runtime rendering engine; and
    means for interactive rendering of the animation using the custom shader and applying the custom shader to the real-time runtime rendering engine that implements the set of functions that provides the interface for application programs to access the real-time runtime rendering engine.

4. A computer program product, comprising:
    a computer readable medium;
    computer program instructions stored on the computer readable medium that, when instructed by a computer, defines an apparatus for defining surface and lighting effects to be applied to a three-dimensional surface in a computer, comprising:
    means for defining three dimensional objects having animation over time and associated lighting and surface properties;
    means for enabling an author to associate a custom shader with a defined three dimensional object to define the lighting and surface properties of the object, wherein the shader is defined as a graph of subshaders, wherein each subshader is defined to perform a real time function selected from a set of functions that provides an interface for application programs to access a real-time runtime rendering engine;
    means for enabling an author to edit the custom shader using visual programming techniques to illustrate the graph and to allow interconnection of subshaders as nodes of the graph including selection of subshaders from a library of subshaders wherein the subshaders are defined to perform real time functions selected from the set of functions that provides the interface for application programs to access the real-time runtime rendering engine; and
    means for interactive rendering of the animation using the custom shader and applying the custom shader to the real-time runtime rendering engine that implements the set of functions that provides the interface for application programs to access the real-time runtime rendering engine.

* * * * *